United States Patent [19]
Wolf et al.

[11] Patent Number: 5,706,869
[45] Date of Patent: Jan. 13, 1998

[54] FILLING THE ANNULUS BETWEEN CONCENTRIC TUBES WITH RESIN

[75] Inventors: Jerry M. Wolf, Powell; Hiten T. Shah, Delaware; Steven J. Crosbie, Prospect; James D. Crosby, Delaware, all of Ohio

[73] Assignee: Acoust-A-Fiber Research & Development, Inc., Delaware, Ohio

[21] Appl. No.: 653,494

[22] Filed: May 24, 1996

[51] Int. Cl.⁶ .............................. B65B 31/00; B67C 3/00
[52] U.S. Cl. ........................ 141/5; 141/59; 141/383; 239/518; 138/149; 264/46.9
[58] Field of Search .................. 141/59, 383, 311 R, 141/325, 5; 239/504, 518; 138/149; 264/46.9, 262, DIG. 83

[56] References Cited

U.S. PATENT DOCUMENTS

| | | | |
|---|---|---|---|
| 3,439,075 | 4/1969 | Bauer et al. | 264/46.9 |
| 3,950,461 | 4/1976 | Levens | 264/46.9 |
| 4,104,481 | 8/1978 | Wilkenloh et al. | 174/28 |
| 4,963,420 | 10/1990 | Jarrin et al. | 428/36.9 |

*Primary Examiner*—Henry J. Recla
*Assistant Examiner*—Timothy L. Maust
*Attorney, Agent, or Firm*—Kremblas, Foster, Millard & Pollick; Sidney W. Millard

[57] ABSTRACT

Concentric conduits are supplied for the purpose of minimizing heat transfer from within the inner conduit through the outer conduit. The air gap or annulus around the inner conduit is filled with a resin mixture which is mixed with vermiculite and mineral fiber to form a slurry. The slurry is pumped into an open end of the annulus to fill the annulus and enhance the heat insulation characteristics of the concentric conduits.

11 Claims, 2 Drawing Sheets

FILLING THE ANNULUS BETWEEN CONCENTRIC TUBES WITH RESIN

FIELD OF THE INVENTION

This invention relates to the filling of the annulus between concentric tubes with a heat insulation slurry which hardens in place.

BACKGROUND OF THE INVENTION

In the automotive industry the transfer of hot exhaust gases from the exhaust manifold in an engine compartment to a tail pipe is a problem because many of the operating components in the engine compartment in proximity to the exhaust system may be prematurely damaged or aged by excessive heat. High temperature operating systems which are not necessarily limited to the automotive industry face the same problem.

As a result of the existing problem, an industry has risen which provides concentric metal tubes or conduits of some length having a flange secured at one end to hold them in proper orientation. That is, the radially spaced tubes provide a heat insulating air gap between the two conduits. Unfortunately, the air gap is not adequate to maintain the outer tube at a suitable low temperature.

What is needed is a mechanism for filling the annulus between the concentric conduits with a material having a low coefficient of thermal conductivity to increase the insulation factor between the inner and outer conduits.

Techniques for forming concentric tubes from some material (usually steel) with an annular gap between the two conduits is a known technology. A patent to Wilkenloh, U.S. Pat. No. 4,104,481 teaches a technique for forming concentric tubes with a foamable resin in the gap between the tubes. The purpose of the resin filling the annulus between the two conduits is to create a dielectric shield between concentric conductors of electricity. The technique used to form the layers of strands of electrically conducting cable is to form the layers sequentially from the inside out.

A patent to Jarrin et al., U.S. Pat. No. 4,963,420 is a similar technique where there are a plurality of inner conduits or cables surrounded by an outer sheath. Again the technique for forming the composite cable is to form the inner conduits and feed them through a nozzle system where the insulation material is extruded in surrounding relationship and thereafter passing the composite conduit through another extrusion process where the outer conduit is formed.

The system described in relation to these two patents is certainly a suitable solution to some problems in some industries, but the particular problem in the existing system does not lend itself to this particular technique. The metallic conduits of the existing system are formed as a unit and have an integral flange at one end. The end of the concentric conduits remote from the flange is open. That is, the inner tube has a completely open passage suitable for the transmission of hot gasses or liquids. The gap or annulus between the concentric conduits is open at that one remote end only. The concentric conduits are structured to be welded or otherwise mechanically attached to some other system where the inner conduit will convey the hot gas or liquid from one end to the other. The air gap between the conduits is to serve as an insulation barrier to minimize the heat transfer from the hot fluid being conveyed to the outer conduit. In those environments where the temperature of the outer conduit rises to an undesirable level over time a solution must be found to shield other operating components in the vicinity of the outer conduit from heat radiation and/or conduction. Certainly one technique is to apply an insulation to the exterior of the outer conduit. The reason such a technique is not desirable is because the externally applied insulation layer may be scraped or displaced during assembly of the concentric conduits.

SUMMARY OF THE INVENTION

A preferred technique is to fill the gap or annulus between the concentric conduits with a heat insulation material after the conduits are formed with the integral flange attached at one end and before the concentric conduits are shipped to the assembly site where they will be mounted to conduct hot fluids.

This invention resulted from experiments to find a suitable slurry which may be pumped through the open end of the annulus toward the flanged end of the concentric conduits to fill the gap between the two conduits and provide the desired degree of insulation. The slurry developed comprises a phenyl formaldehyde resin uniformly mixed with flaked vermiculite and mineral fiber in suitable proportions which flows within the annulus. In the environment in which this set of conduits is structured to work, the radial width of the annulus may be as small as one quarter inch, but more commonly will be in the nature of one-half inch.

The resin slurry is initially mixed to a uniform constancy and pumped from some source such as a barrel or bucket through a nozzle into the annular area surrounding the inner conduit. A nozzle fits over the open ends of the conduits. The nozzle comprises a unique structure being formed of a tube having an inlet on one end and incorporating a pair of sleeves which form an outlet at the other end. The inner sleeve of the nozzle includes a transverse wall which blocks the exit of any fluids inwardly of the inner sleeve. An aperture in the nozzle upstream of the transverse wall allows the pumped resin slurry to pass between the sleeves and into the annulus between the concentric conduits.

One or more holes is provided in the outer conduit near to the integral flange to allow the escape of air from the annulus as the slurry flows from the nozzle into the annulus and progresses toward the flange. The hole serves another purpose, it also allows the operator of the system to see when the annulus has been filled with the resin slurry because the slurry will start to dribble out of the hole.

Objects of the invention not understood from the above will be abundantly clear upon a review of the drawings described subsequently and a review of the description of the preferred embodiment which follows.

DESCRIPTION OF THE PREFERRED EMBODIMENT

Figure 1:
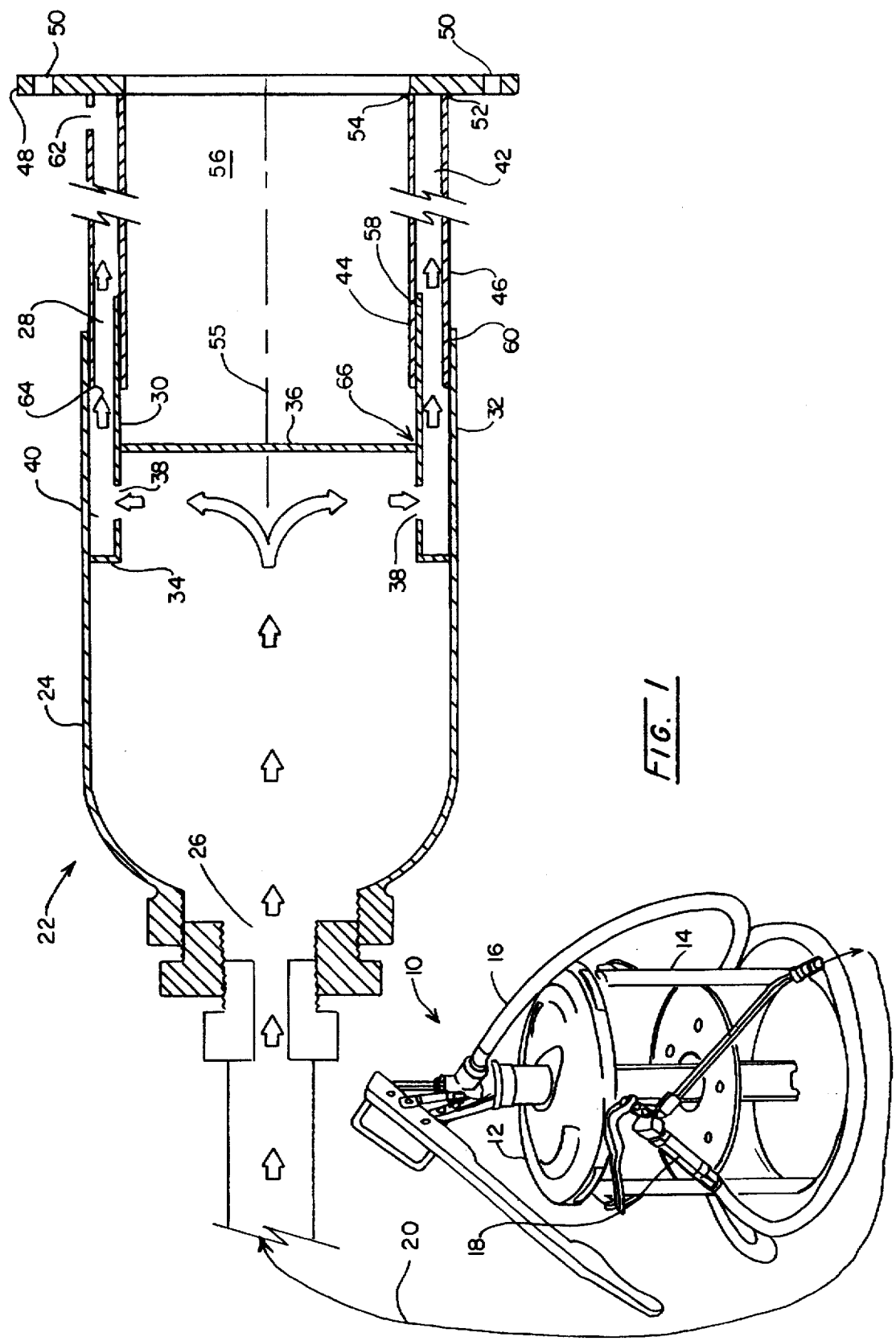
FIG. 1 is a schematic view of the apparatus for injecting resin slurry into the annular gap between concentric tubes including the nozzle shown in section.
Figure 2:
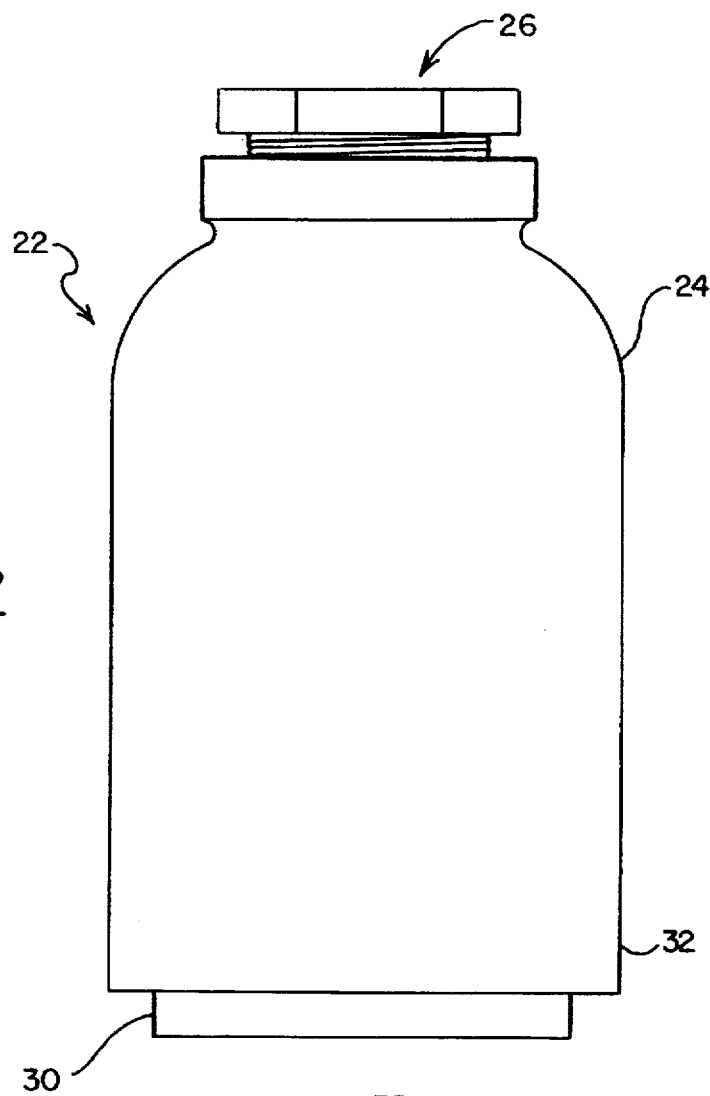
FIG. 2 is a side elevational view of the nozzle of FIG. 1.
Figure 3:
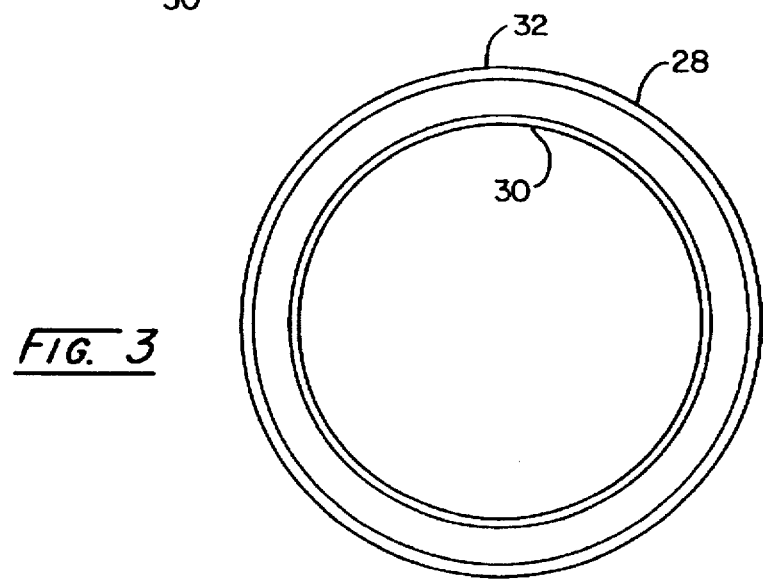
FIG. 3 is an end elevational view of the nozzle of FIG. 2.

Looking to FIG. 1, a conventional pump 10 is mounted on a lid 12 supported by a framework 14. The lid and framework are designed to fit inside a bucket or barrel (not shown) to pump the liquid from the barrel. Such pump and container structure is conventional and need not be described in detail.

The liquid pumped from the barrel exits through a hose 16 and is discharged from the hose though a valve structure 18 which is also conventional. Fluid passing through valve 18 ultimately moves through duct work in the form of a hose or the like 20 to a nozzle indicated generally at 22.

Nozzle 22 is connected to conduit 20 such that fluid delivered from the barrel enters a tube 24 through a feed opening 26.

At the opposite end of nozzle 22 is a discharge opening 28. Discharge opening 28 is formed by a pair of concentric inner and outer sleeves 30, 32, respectively.

In the particular embodiment illustrated, outer sleeve 32 is. coextensive with the side wall of tube 24. Inner sleeve 30 is supported concentrically within sleeve 32 by an inwardly projecting annular flange 34. It will be appreciated that inner sleeve 30 could be a coextensive extension of tube side wall 24 and the outer sleeve 32 could be supported by a radially outwardly extending flange 34. Such structure would be equally operable.

An impermeable barrier wall 36 extends transversely completely across the opening between the inner Surfaces of inner sleeve 30 such that no fluid passes from nozzle 22 inside sleeve 30.

A plurality of apertures 38 allow the radial passage of fluid entering the nozzle at feed opening 26 to flow radially outwardly through inner sleeve 30 into the annular passage 40 between sleeves 30 and 32 and ultimately to be discharged through discharge opening 28.

Nozzle 22 is particularly structured to deliver a resin slurry into an annulus 42 formed between concentric inner and outer conduits 44, 46, respectively. Such concentric conduit structure is supplied from a manufacturer already assembled in concentric configuration. The conduits are held in place by an integral flange 48. In the structure shown flange 48 serves as a bridge, blocking the passage of fluid through said annulus where said conduits 44, 46 are secured together.

Flange 48 is conventional and includes conventional bolt holes 50. In the illustrated embodiment, conduits 44 and 46 are shown as being welded to flange 48 at 52 and 54. This allows the radially extending flange 48 to hold the conduits 44 and 46 in their concentric, radially spaced position, concentric about an axis 55 extending the length of the hot liquid conducting element which is structured to transmit hot fluid in air duct 56 from one end to the other when it is assembled in operative condition.

The resin slurry to be pumped from the barrel by pump 10 through nozzle 22 and into the annular gap 40 between conduits 44 and 46 comprises a fluid mixture of phenyl-formaldehyde resin mixed with flaked or ground vermiculite and ceramic or ceramic mineral fibers, for example, amorphous calcium magnesium aluminum silicate. The mixture includes about equal amounts of the fiber and vermiculite by weight (40–50% each) and about 8–12% resin. Preferably the ingredients are about 45% vermiculite, 45% fibers and 10% phenyl formaldehyde resin. Ceramic fibers of various compositions are suitable. One example of a suitable fiber which is commercially available is sold under the trademark "min-K."

The resin is purchased from a number of conventional sources and any are suitable for use in this environment and may include portions of methyl alcohol and the like, such that the resin will set over time after it is pumped into the operative annular gap described previously. The solids comprise about 15–21% and preferably about 18% by volume in the combination. The solids tend to settle when they are allowed to stand. Accordingly, agitating and mixing of the components is desirable immediately prior to pumping them into their intended location.

The calcium magnesium aluminum silicate fibers are formed in conventional fashion and have a melting point of about 1000° C., a density of about 80–300 kilograms per cubic meter and are insoluble in water. Each fiber is of a size greater than three microns in diameter and has a length in excess 200 microns. Preferably the fibers have a diameter of about 25 microns and length of about 300 microns, but larger sizes and lengths are acceptable so long as the size of the annular gap to be filled does not tend to clog because of the physical properties of the fibers.

The mineral vermiculite is readily available from many sources and any are suitable for this use. One suitable source is commonly referred to as Vermiculite #7 and it has a dry density of about 5–10 pounds per cubic foot.

Filling Procedure

The pumpable resin slurry is suitably mixed to a uniform or consistent mixture in a barrel and is pumped by pump 10 through hose 16 and duct 20 to an entrance or feed opening 26 in a nozzle 22.

Prior to beginning the pumping operation, the nozzle 22 is assembled on the free end of the concentric conduits 44, 46. Note that inner sleeve 30 projects beyond the termination point of sleeve 32. This facilitates the sliding of the nozzle into operative position in the free end of the concentric conduits. Further, it allows visual assurance that both sleeves 30, 32 engage one of the concentric conduits 44, 46.

The pumpable resin is somewhat viscous in its constancy, but it is preferred that some sealing mechanism be incorporated with the concentric sleeves 30, 32. In the illustrated embodiment, annular o-rings 58, 60 are mounted on the internal surfaces of sleeves 30 and 32 to serve this sealing feature. It will be understood very clearly that other means for sealing may be adopted if desired. Indeed, no sealing mechanisms may be required in all situations because of the viscosity of the phenyl formaldehyde resin.

As the resin is pumped into the nozzle 22 it progresses toward impermeable wall 36 and then flows radially through apertures 38 into annular passage 40 and then longitudinally into the annulus 42 formed by the concentric conduits 44, 46. The resin flows longitudinally along the conduits until it abuts the surface of flange 48. All the while, the air in the annulus 42 escapes through bleed hole 62 in outer conduit 46.

As soon as the annulus 42 is filled with the resin, it will begin to drip or extrude out of hole 62 which is a test or gauge for the operator to know that the annulus is full and the pumping can stop.

To facilitate the intended use of the annular conduits incorporating the solidified resin, a gap of about one-half inch at the open end 64 of annulus 42 is to be maintained. This is accomplished by providing an abutment 66 to limit the insertion of the nozzle into open end 64 to about one-half inch. In the preferred embodiment the abutment 66 is the radially outer portion of wall 36 where it is sealingly secured to the inner surface of inner sleeve 30. Obviously, other abutment or flange type structures could be designed without departing from the spirit of the invention.

Having described the invention in its preferred embodiment obvious structural and procedural modifications could be made by those having ordinary skill in the art without departing from the spirit of the invention. Accordingly, it is not intended that the invention be limited by the words used to describe the invention nor the drawings illustrating the same. Rather it is intended that the invention be limited only by the scope of the appended claims.

We claim:

1. A process of filling the annulus between concentric conduits with fluid material comprising, providing concentric conduits secured together at one end and being of similar length, a bridge blocking the passage of fluid through said annulus where said conduits are secured together, said conduits terminating at a location remote from said bridge and forming an open inner passage in said inner conduit and an open annulus between said conduits, forming a bleed hole in the outer of the concentric conduits, said hole being near said bridge, inserting the discharge end of a nozzle into said open inner passage, injecting fluid material into said nozzle through a feed opening, blocking flow of said material from said nozzle into said open inner passage, discharging said fluid material from said nozzle only into said open annulus, exhausting any gaseous material in said annulus through said bleed hole while said fluid material flows in said annulus along said conduits toward said bridge, and determining when said annulus is full of said material by observing the discharge of fluid material through said bleed hole.

2. The process of claim 1 including withdrawing said nozzle from said conduits and leaving a gap in said annulus unfilled by said material where said conduits terminate.

3. The process of claim 2 including mixing vermiculite, fibers and phenol formaldehyde resin to form a slurry of said material prior to injecting said material into said nozzle.

4. The process of claim 3 wherein said material is a mixture of about 40–50% vermiculite, about 40–50% mineral fiber and about 8–12% phenol formaldehyde by weight.

5. The process of claim 4 wherein said vermiculite and mineral fiber comprise about 15–21% by volume of said slurry.

6. The process of claim 5 wherein said mineral fiber comprises amorphous calcium magnesium aluminum silicate having a melting point of about 1000° C. and a dry density of about 80–300 kg/m$^3$.

7. The process of claim 1 including mixing vermiculite, mineral fibers and phenol formaldehyde resin to form a slurry of said material prior to injecting said material into said nozzle.

8. The process of claim 7 wherein said material is a mixture of about 40–50% vermiculite, about 40–50% mineral fiber and about 8–12% phenol formaldehyde by weight.

9. The process of claim 8 wherein said vermiculite and mineral fiber comprise about 15–21% by volume of said slurry.

10. The process of claim 3 wherein said vermiculite and mineral fiber comprise about 15–21% by volume of said slurry.

11. The process of claim 1 wherein said material is a mixture of about 40–50% vermiculite, about 40–50% mineral fiber and about 8–12% phenol formaldehyde by weight.

* * * * *

UNITED STATES PATENT AND TRADEMARK OFFICE
CERTIFICATE OF CORRECTION

PATENT NO. : 5,706,869
DATED : January 13, 1998
INVENTOR(S) : Jerry M. Wolf et al.

It is certified that error appears in the above-indentified patent and that said Letters Patent is hereby corrected as shown below:

Title page, item [75] delete "James D. Crosby" and insert therefor --James D. Crosbie--.

Signed and Sealed this

Fourteenth Day of April, 1998

Attest:

BRUCE LEHMAN

Attesting Officer

Commissioner of Patents and Trademarks